US006929670B1

(12) United States Patent
Hamed et al.

(10) Patent No.: US 6,929,670 B1
(45) Date of Patent: Aug. 16, 2005

(54) SAND SEPARATING APPARATUS FOR A THERMAL SAND REMOVAL OVEN

(75) Inventors: Mohamed S. Hamed, St. Catherines (CA); Alan Van Geyn, Burlington (CA)

(73) Assignee: Can-Eng Furnaces Ltd., Niagara Falls (CA)

( * ) Notice: Subject to any disclaimer, the term of this patent is extended or adjusted under 35 U.S.C. 154(b) by 261 days.

(21) Appl. No.: 10/056,579

(22) Filed: Jan. 25, 2002

(51) Int. Cl.[7] .............................................. B01D 45/08

(52) U.S. Cl. ........................... 55/321; 55/324; 55/325; 55/442; 55/444; 55/447; 55/DIG. 25; 95/269; 95/272; 96/55; 164/5; 164/132; 164/404

(58) Field of Search ......................... 55/321, 324, 325, 55/442, 444, 447, DIG. 25; 95/269, 272; 96/55; 164/5, 132, 404

(56) References Cited

U.S. PATENT DOCUMENTS 4,300,918 A * 11/1981 Cary .......................... 55/337
4,869,737 A * 9/1989 Parenti ........................ 55/321
4,999,037 A * 3/1991 Albritton et al. .......... 55/385.1
5,378,265 A * 1/1995 Pearl .......................... 55/356
5,389,127 A * 2/1995 Wurz et al. ................... 55/440
5,829,509 A * 11/1998 Crafton ........................ 164/5
5,957,188 A * 9/1999 Crafton ........................ 164/5
6,152,988 A * 11/2000 Plaks et al. ................ 55/341.1
6,193,774 B1 * 2/2001 Durdag et al. ............. 55/385.6
6,224,654 B1 * 5/2001 Chawla ....................... 55/325
6,468,321 B2 * 10/2002 Kinsel ........................ 55/457

OTHER PUBLICATIONS

Webster's Ninth New Collegiate Dictionary by Merriam-Webster, 1991, p. 283.*

Kefa Cen, Xiaodong Li, Yangxin Li, Jianhua Yan, Yueliang Shen, Shaorong Liang & Mingjiang Ni, Experimental study of a finned tubes impact gas-solid separator for CFB boilers, Chemical Engineering Journal 66 (1997) pp. 159-169.

S. De, A. K. Lal & P. K. Nag, An experimental investigation on pressure drop and collection efficiency of simple plate-type impact separator, Powder Technology 106 (1999) pp. 192-198.

* cited by examiner

*Primary Examiner*—Minh-Chau T. Pham
(74) *Attorney, Agent, or Firm*—Simpson & Simpson, PLLC

(57) ABSTRACT

An apparatus for the separation of sand from an air stream in a thermal sand removal oven is disclosed. The preferred embodiment of the apparatus comprises a plurality of members comprising two planar members joined to form "V" shaped members. The vertex of the "V" shape points generally in the direction of the air current. The apparatus is installed in the recirculated air stream of a thermal sand removal oven, in a location between the sand molds and the air circulation means. The present invention is also installed in ovens containing metal castings containing sand cores, and ovens containing metal castings both encased in a sand mold and containing a sand core.

11 Claims, 6 Drawing Sheets

SAND SEPARATING APPARATUS FOR A THERMAL SAND REMOVAL OVEN

FIELD OF THE INVENTION

This invention relates to an apparatus to remove particles of a solid from a gas. More particularly, this invention relates to an apparatus for removing sand from air. Even more particularly, this invention relates to an apparatus to separate sand from the air stream in a thermal sand removal oven.

BACKGROUND OF THE INVENTION

It is well known that sand can be used as a mold for metal castings. An organic binder is mixed with the sand to allow the sand to be formed into a mold. Molten metal is then poured into the mold. When the metal cools, the sand mold is removed, leaving the finished metal part.

The sand can be removed from the metal casting mechanically or thermally. Mechanical removal entails shaking the mold until it breaks apart, or physically tearing the mold off the metal part. Thus, mechanical removal can damage the metal part. In addition, the metal part is generally heat treated after it cools, which can be done in combination with thermal removal of the sand mold. For these reasons, thermal means are generally the preferred method used to remove the sand mold.

Thermal removal comprises placing the mold and the casting in a thermal sand removal oven. The mold and casting are heated with a stream of hot air, generally at high velocity. The hot air causes the organic binder to combust, releasing the sand. The sand then falls off the castings due to gravity, although some portion of it is mixed into the air stream. The air stream is generally at a high velocity to increase the speed of the removal of sand from the castings. To increase the speed of the air stream, fans are generally used to blow the hot air over the castings. The air is generally recirculated to keep the air temperature high, reducing the cost of heating the oven. This leads to the problem of the sand being recirculated with the air. The recirculated sand damages the fan blades, or whatever means are used to recirculate the air. This damage increases the cost of running the oven, and increases the downtime of the oven due to the maintenance needed.

Clearly, then, there is a longfelt need for an apparatus to separate the sand from the air stream in a thermal sand removal oven.

SUMMARY OF THE INVENTION

The present invention comprises an apparatus for the separation of sand from an air stream in a thermal sand removal oven. The preferred embodiment of the apparatus comprises a plurality of members comprising two planar members joined to form "V" shaped members. The vertex of the "V" shape points generally in the direction of the air current. The apparatus is installed in the recirculated air stream of a thermal sand removal oven, in a location between the metal castings encased in sand molds and the air circulation means. The present invention is also installed in ovens containing metal castings containing sand cores, and ovens containing metal castings both encased in a sand mold and containing a sand core.

A general object of the present invention is to provide an apparatus for the removal of sand from the air stream in a thermal sand removal oven.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE PREFERRED EMBODIMENT

It should be appreciated that, in the detailed description of the invention that follows, like reference numbers on different drawing views are intended to identify identical structural elements of the invention in the respective views.

The figures show metal castings encased by sand molds. However, it should be readily apparent to one skilled in the art that metal castings may also contain sand cores, in addition to or instead of being encased by a sand mold. The present invention installed in an oven containing a metal casting encased by a sand mold, containing a sand core, or both is within the spirit and scope of the invention as claimed.

Figure 1:
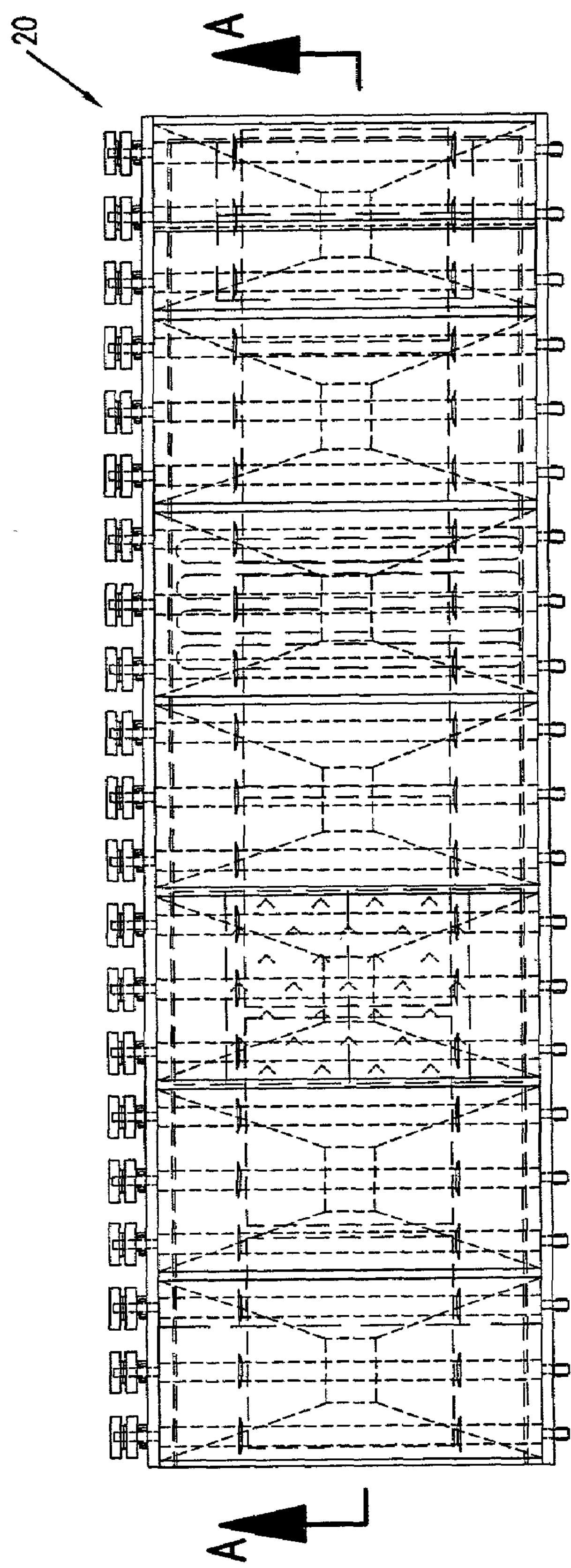
FIG. 1 is a top view of a thermal sand removal oven that circulates the air in a generally horizontal direction, with the preferred embodiment of the present invention installed within.
Figure 2:
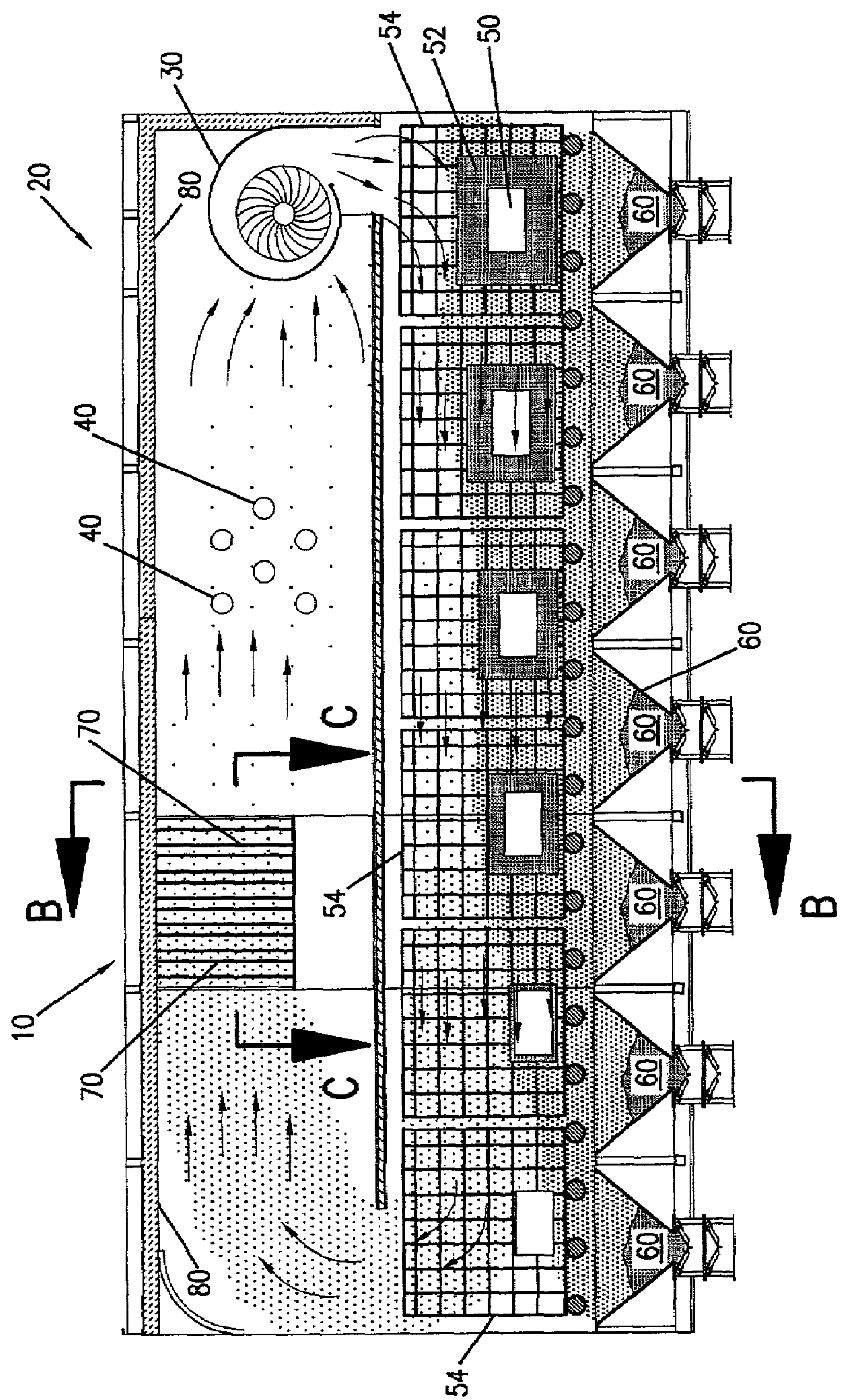
FIG. 2 is a side cross sectional view of a thermal sand removal oven, taken at plane A—A of FIG. 1.
Figure 3:
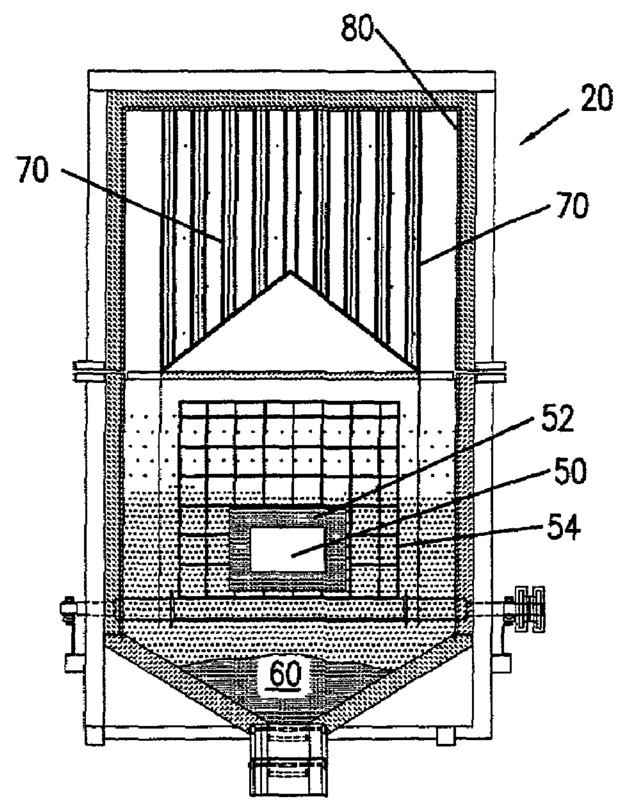
FIG. 3 is a front cross sectional view of a thermal sand removal oven, taken at plane B—B of FIG. 2.

FIG. 1 is a top view of a thermal sand removal oven, generally designated 20, with the present invention installed within. The thermal sand removal oven shown in FIG. 1 circulates the air in a generally horizontal direction. The preferred embodiment of the present invention is shown in FIG. 2, generally designated 10. Fan 30 blows hot air across the metal castings 50 and sand molds 52, which are held in work baskets 54. The figures show that fans are used to move the air through the oven. However, it should be readily apparent to one skilled in the art that different means of moving the air may be used, such as blowers. These modifications to the ovens are within the spirit and scope of the invention as claimed. In the thermal sand removal oven shown in FIG. 2, radiant tube burners 40 heat the air. It should be readily apparent to one skilled in the art that other means could be used to heat the air. The present invention installed in an oven with these modifications is within the spirit and scope of the invention as claimed. The hot air causes the organic binder to combust, causing the mold to fall apart. Work baskets 54 generally have mesh bottoms to allow the sand to fall into sand hoppers 60 due to gravity. However, some of the sand enters the air stream. Members 70 of the present invention are located in the path of the air stream before the air recirculates to fan 30. Members 70 are attached to inner walls 80 of thermal sand removal oven 20. Members 70 have a "V" shaped cross section, as shown in FIG. 3. Some of the sand in the air stream impacts members 70. The sand that impacts members 70 is slowed or stopped by the members. The slowed or stopped sand then falls due to gravity into sand hoppers 60.

FIG. 3 is a front cross sectional view of the preferred embodiment of the present invention installed in oven 20.

Figure 4:
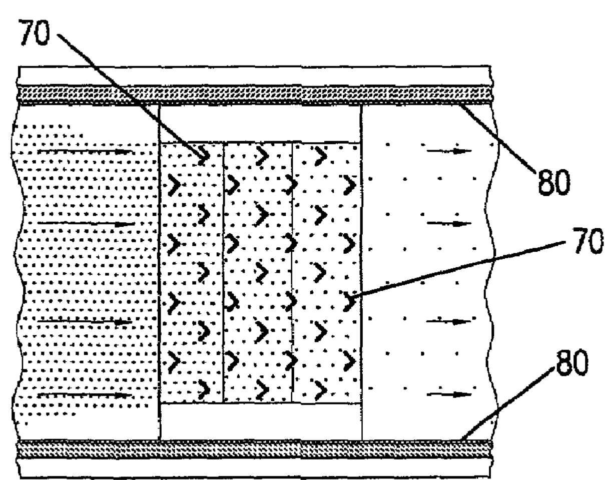
FIG. 4 is a top cross sectional view of a thermal sand removal oven, taken at plane C—C of FIG. 2.

A top cross sectional view of the preferred embodiment of the present invention is shown in FIG. 4. The "V" shape of the members can be seen in this view. The vertex of the "V" points in the general direction of the air stream. FIG. 4 shows the angle of the member to be 90 degrees, but angles from 30 degrees to 150 degrees are within the spirit and scope of the invention as claimed.

It should be readily apparent to those skilled in the art that other shapes for the member can be used just as effectively. For example, the loops may be "C" shaped, "W" shaped, "U" shaped, or made in virtually any other shape that is capable of separating the sand. All these other configurations are intended to be within the spirit and scope of the invention as claimed, and to be within the penumbra of the definition of the phrase "V" shaped.

Figure 5:
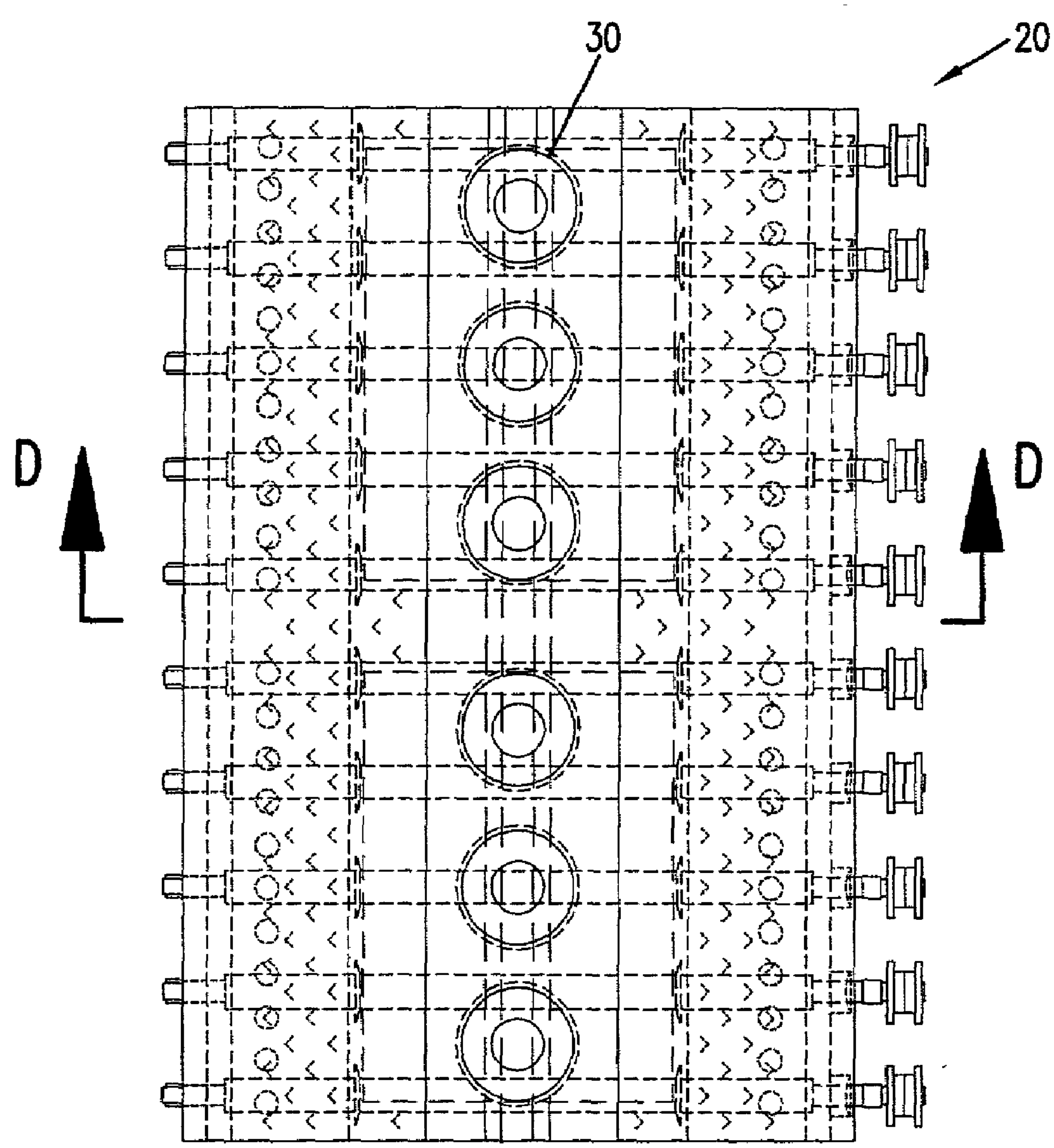
FIG. 5 is a top view of a thermal sand removal oven that circulates the air in a generally vertical direction, with the preferred embodiment of the present invention installed within.
Figure 6:
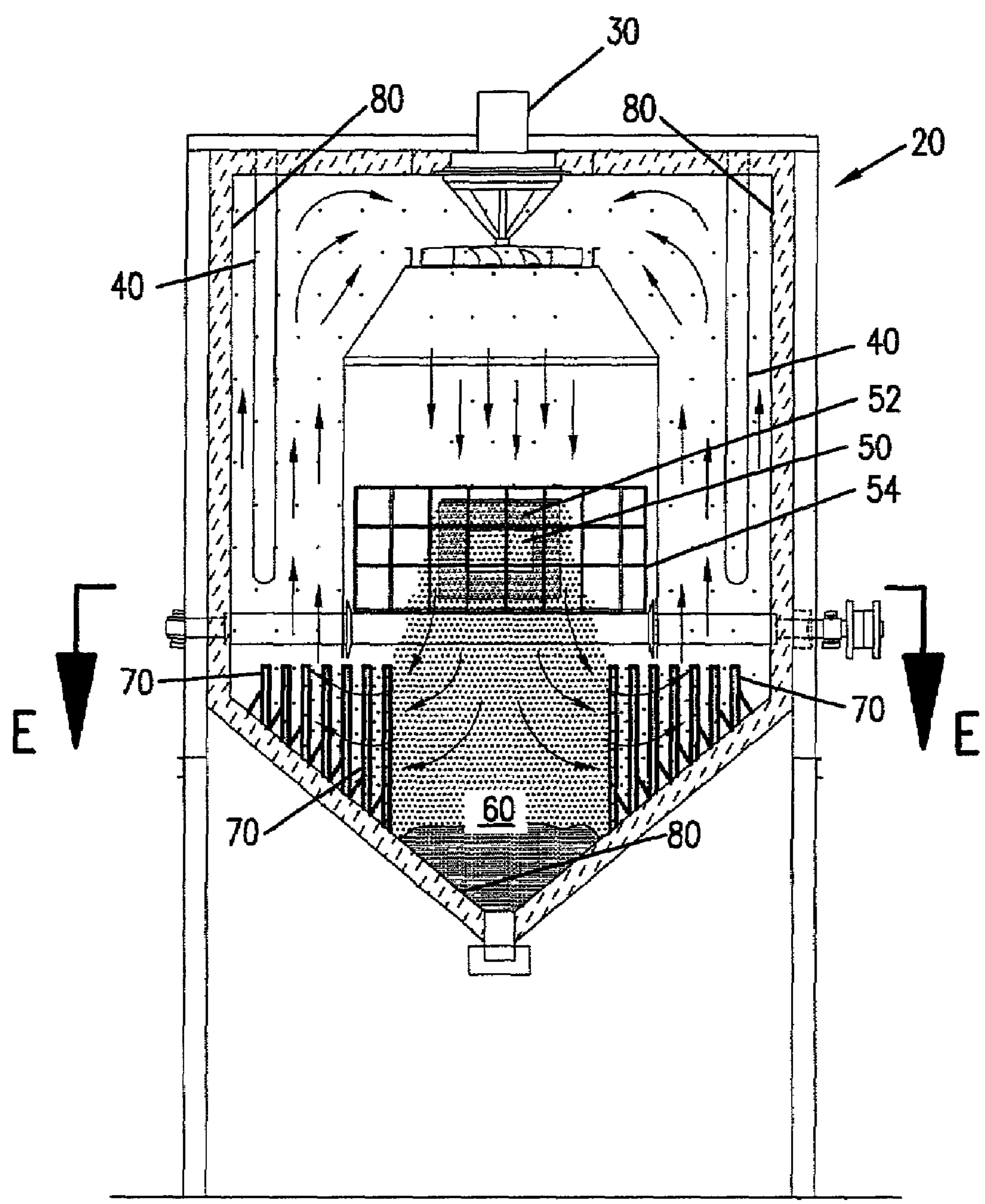
FIG. 6 is a front cross sectional view of a thermal sand removal oven, taken at plane D—D of FIG. 5.
Figure 7:
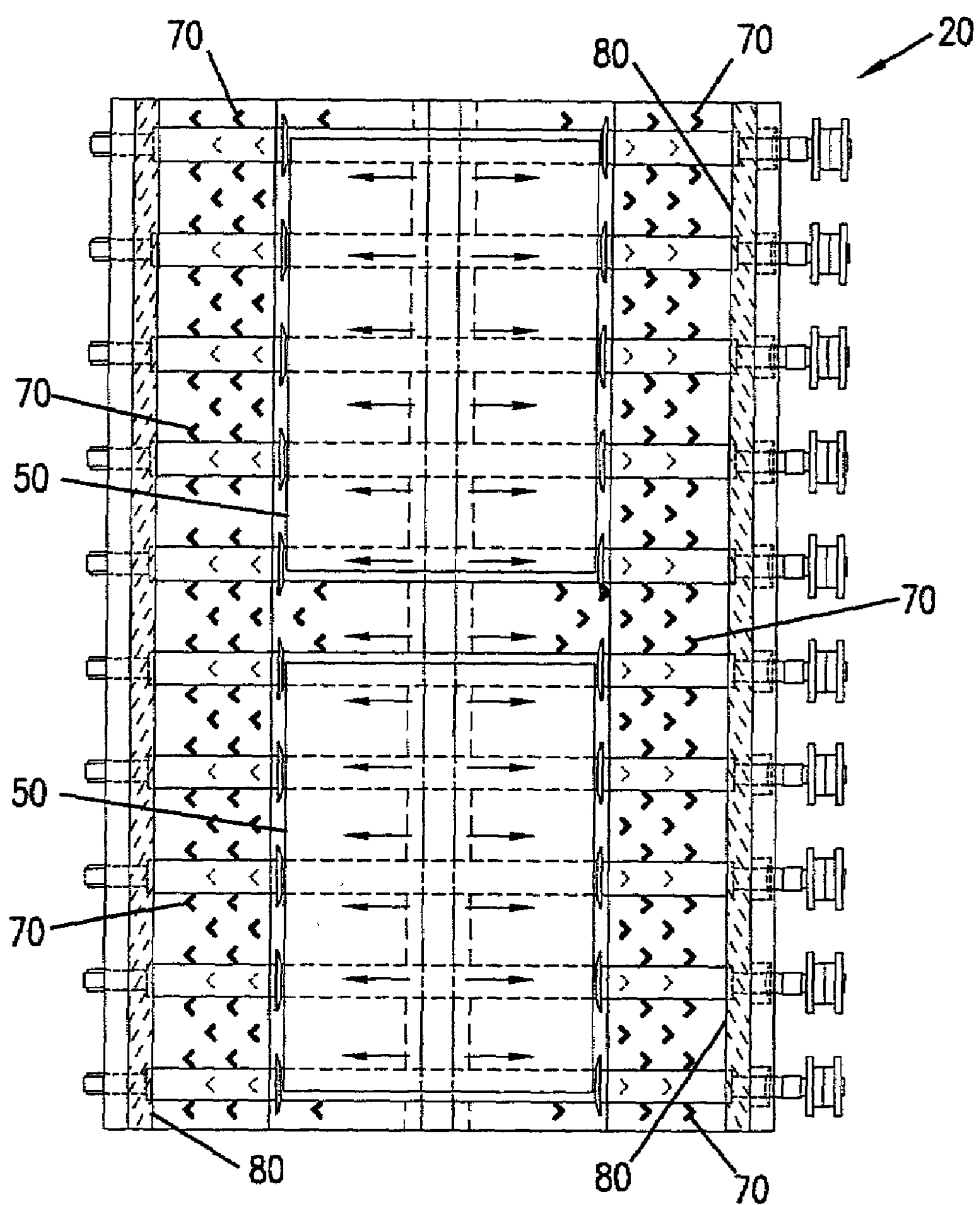
FIG. 7 is a top cross sectional view of a thermal sand removal oven, taken at plane E—E of FIG. 6.

FIG. 5 is a top view of a thermal sand removal oven, generally designated 20, with the present invention installed within. The thermal sand removal oven shown in FIG. 5 circulates the air in a generally vertical direction. The preferred embodiment of the present invention, generally designated 10, is shown in FIG. 6. Fan 30 blows hot air down over the metal castings 50 and sand molds 52, which are held in work baskets 54. In the thermal sand removal oven shown in FIG. 6, radiant tube burners 40 heat the air. As discussed above, other means of moving and heating the air are possible, and these modifications are within the spirit and scope of the invention as claimed. The hot air causes the organic binder to combust, causing the mold to fall apart. Work baskets 54 generally have mesh bottoms to allow the sand to fall into sand hoppers 60 due to gravity. However, some of the sand enters the air stream. Members 70 of the present invention are located in the path of the air stream before the air recirculates to fan 30. Members 70 are attached to inner walls 80 of thermal sand removal oven 20. Members 70 have a "V" shaped cross section, as shown in FIG. 7. Some of the sand in the air stream impacts members 70. The sand that impacts members 70 is slowed or stopped by the members. The slowed or stopped sand then falls due to gravity into sand hopper 60.

A top cross sectional view of a thermal sand removal oven with the preferred embodiment of the present invention installed is shown in FIG. 7.

This apparatus will reduce maintenance costs of the equipment by significantly reducing the erosion of the furnace internals by sand in the air stream. In particular, it will reduce the wear and tear on fan blades, or the parts of other means used to move the air through the oven. Thus, the sand separator will increase the life of the air recirculating devices. Decreased maintenance will decrease the downtime of the oven, resulting in lower costs and greater productivity for the oven operator.

Thus, it is seen that the objects of the present invention are efficiently obtained, although modifications and changes to the invention should be readily apparent to those having ordinary skill in the art, and these modifications are intended to be within the spirit and scope of the invention as claimed. In particular, other configurations of ovens are possible other than the two disclosed. The present invention installed in ovens with these other configurations is within the spirit and scope of the invention as claimed.

What we claim is:

1. An apparatus for the removal of sand from a metal casting encased in a sand mold located in an air stream in a thermal sand removal oven comprising:

means to move air through said oven, said means to move air operatively arranged to move air along said air stream in said thermal sand removal oven, said air stream traversing said metal casting encased in said sand mold, said air stream recirculating past said means to move air and said metal casting encased in said sand mold; and a plurality of sand removal members, said members secured to an inside wall of said thermal sand removal oven, said members projecting into said recirculating air stream, said members located in said air stream between said at least casting encased in said sand mold and said means to move air, and said sand removal members arranged to precipitate sand entrained in said air stream.

2. The apparatus recited in claim 1 wherein each said sand removal member comprises two planar members joined to form a "V" shaped structure, where each structure includes a vertex, said vertex of said "V" shape pointing generally in the direction of the air stream.

3. The apparatus recited in claim 2 wherein said planar members are joined at an angle in the range of approximately 30 degrees to approximately 150 degrees, as measured between the two respective planar members of the "V" shaped structure.

4. The apparatus recited in claim 2 wherein said planar members are joined at an angle of approximately 90 degrees, as measured between the two respective planar members of the "V" shaped structure.

5. An improvement to a thermal sand removal oven comprising:

a plurality of sand removal members, said members secured to an inside wall of said thermal sand removal oven, said members operatively arranged to project into a recirculating air stream, said members located in said air stream between at least one metal casting encased in a sand mold and a device to move air through said oven, and said sand removal members arranged to precipitate sand entrained in said air stream.

6. An apparatus for the removal of sand from an air stream in a thermal sand removal oven comprising:

at least one metal casting encased in a sand mold in said thermal sand removal oven;

a device to move air through said oven, said device operatively arranged to move air along said air stream in said thermal sand removal oven, said air stream traversing said at least one metal casting encased in said sand mold, said air stream recirculating past said device and said at least one metal casting encased in said sand mold; and a plurality of sand removal members, said members secured to an inside wall of said thermal sand removal oven, said members projecting into said recirculating air stream, said members located in said air stream between said at least one metal casting encased in said sand mold and said air moving device, and said sand removal members arranged to precipitate sand entrained in said air stream.

7. The apparatus recited in claim 6 wherein each said sand removal member comprises two planar members joined to form a "V" shaped structure, where each structure includes a vertex, said vertex of said "V" shape pointing generally in the direction of the air stream.

8. The apparatus recited in claim 7 wherein said planar members are joined at an angle in the range of approximately 30 degrees to approximately 150 degrees, as measured between the two respective planar members of the "V" shaped structure.

9. The apparatus recited in claim 7 wherein said planar members are joined at an angle of approximately 90 degrees, as measured between the two respective planar members of the "V" shaped structure.

10. An apparatus for the removal of sand from a metal casting containing a sand core located in an air stream in a thermal sand removal oven comprising:

means to move air through said oven, said means to move air operatively arranged to move air along said air stream in said thermal sand removal oven, said air stream traversing said at least one metal casting containing said sand core, said air stream recirculating past said means to move air and said at least one metal casting containing said sand core; and a plurality of sand removal members, said members secured to an inside wall of said thermal sand removal oven, said members projecting into said recirculating air stream, said members located in said air stream between said at least one metal casting containing said sand core and said means to move air, and said sand removal members arranged to precipitate sand entrained in said air stream.

11. The apparatus recited in claim 1 wherein said sand precipitates from said air stream by gravity.

* * * * *